United States Patent
Davis et al.

(10) Patent No.: US 11,568,494 B1
(45) Date of Patent: Jan. 31, 2023

(54) AERIAL IMAGING FOR INSURANCE PURPOSES

(71) Applicant: STATE FARM MUTUAL AUTOMOBILE INSURANCE COMPANY, Bloomington, IL (US)

(72) Inventors: Timothy Joel Davis, Warrenville, IL (US); Amy Engelhorn, Normal, IL (US); Tami R. Custer, Hudson, IL (US); Karen E. Przybylski, Bloomington, IL (US); Paul C. Szews, Wauwatosa, WI (US); Rosemarie Geier Grant, Ellsworth, IL (US); Eric Haefli, Bloomington, IL (US); Arthur P. Paulette, Jr., Bristol, CT (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 182 days.

(21) Appl. No.: 16/933,358

(22) Filed: Jul. 20, 2020

Related U.S. Application Data

(63) Continuation of application No. 15/093,901, filed on Apr. 8, 2016, now Pat. No. 10,755,357.
(Continued)

(51) Int. Cl.
*G06Q 40/08* (2012.01)
*G06Q 50/16* (2012.01)
*G06V 20/10* (2022.01)

(52) U.S. Cl.
CPC ........... *G06Q 40/08* (2013.01); *G06Q 50/163* (2013.01); *G06V 20/176* (2022.01);
(Continued)

(58) Field of Classification Search
CPC .... G06Q 40/08; G06Q 50/163; G06V 20/188; G06T 2207/10032; G06T 2207/30184; G06T 2207/30188; G06T 2207/30192
(Continued)

(56) References Cited

U.S. PATENT DOCUMENTS 5,038,384 A    8/1991 Ohoba
5,398,577 A  *  3/1995 Pierce ................. A01G 23/099
                                                    144/380
(Continued)

OTHER PUBLICATIONS

Minowa et al., "Verification of a Deep Learning-Based tree species Identification model using images of broadleaf and Coniferous Tree leaves", Forests 13.6:943. MDPI AG . (Year: 2022).*
(Continued)

*Primary Examiner* — Frantzy Poinvil
(74) *Attorney, Agent, or Firm* — Marshall, Gerstein & Borun LLP

(57) ABSTRACT

In a computer-implemented method, one or more digital aerial images of a property of a current or potential policyholder may be received. The digital aerial image(s) may be processed to determine one or more features of the property, including one or more features of a tree. A predicted location of roots of the tree is determined based upon the tree feature(s). The property feature(s) is/are analyzed to determine a risk of damage to a structure located on the property, by analyzing at least the predicted location of roots of the tree to determine a risk of damage to a foundation of the structure. Based at least in part on this risk, a risk output is generated that includes an indication of whether action should be taken to mitigate the risk of damage and/or whether insurance coverage should be offered, and/or includes a measure of the risk of damage.

20 Claims, 5 Drawing Sheets

Related U.S. Application Data

(60) Provisional application No. 62/193,732, filed on Jul. 17, 2015.

(52) U.S. Cl.
CPC .. *G06V 20/188* (2022.01); *G06T 2207/10032* (2013.01); *G06T 2207/30184* (2013.01); *G06T 2207/30188* (2013.01); *G06T 2207/30192* (2013.01)

(58) Field of Classification Search
USPC ........................................................ 705/3–44
See application file for complete search history.

(56) References Cited

U.S. PATENT DOCUMENTS

| | | |
|---|---|---|
| 6,333,997 B1 | 12/2001 | Hashiya et al. |
| 7,080,080 B1 | 7/2006 | Miller |
| 7,305,129 B2 | 12/2007 | Chellapilla et al. |
| 7,536,025 B2 | 5/2009 | Folchetti et al. |
| 8,300,896 B2 | 10/2012 | Kelle et al. |
| 8,346,578 B1 | 1/2013 | Hopkins, III et al. |
| 8,633,964 B1 | 1/2014 | Zhu |
| 8,885,916 B1 | 11/2014 | Maurer et al. |
| 8,977,033 B1 | 3/2015 | Maurer et al. |
| 9,064,177 B1 | 6/2015 | Maurer et al. |
| 9,927,809 B1 | 3/2018 | Tofte et al. |
| 9,969,628 B2 | 5/2018 | Bhikhi et al. |
| 9,970,881 B1* | 5/2018 | Hillman ................ H04N 7/185 |
| 10,311,302 B2 | 6/2019 | Kottenstette et al. |
| 10,366,288 B1 | 7/2019 | Kottenstette et al. |
| 10,643,072 B2 | 5/2020 | Kottenstette et al. |
| 10,755,357 B1* | 8/2020 | Davis ................... G06V 20/176 |
| 10,991,049 B1* | 4/2021 | Devereaux ........... G06V 20/188 |
| 11,151,378 B2 | 10/2021 | Kottenstette et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,367,265 B2 | 6/2022 | Vianello et al. |
| 2004/0233461 A1 | 11/2004 | Armstrong et al. |
| 2005/0025357 A1 | 2/2005 | Landwehr et al. |
| 2006/0188139 A1* | 8/2006 | Khamene ............. G06V 20/647 |
| | | 382/130 |
| 2006/0210192 A1 | 9/2006 | Orhun |
| 2007/0291994 A1* | 12/2007 | Kei ........................ G01S 7/4802 |
| | | 382/110 |
| 2008/0114655 A1 | 5/2008 | Skidmore |
| 2008/0205728 A1 | 8/2008 | Quist |
| 2008/0295582 A1 | 12/2008 | Lee et al. |
| 2009/0182749 A1 | 7/2009 | Walker |
| 2009/0265193 A1 | 10/2009 | Collins et al. |
| 2010/0303336 A1 | 12/2010 | Abraham et al. |
| 2011/0134238 A1 | 6/2011 | Kotchou et al. |
| 2012/0113141 A1 | 5/2012 | Zimmerman et al. |
| 2012/0311053 A1 | 12/2012 | Labrie et al. |
| 2013/0093882 A1 | 4/2013 | Kotzur et al. |
| 2014/0023280 A1 | 1/2014 | Lin et al. |
| 2014/0079326 A1 | 3/2014 | Ito et al. |
| 2014/0118496 A1 | 5/2014 | Calakli et al. |
| 2014/0161308 A1 | 6/2014 | Krishnamoorthy |
| 2014/0193039 A1 | 7/2014 | Wexler |
| 2014/0280269 A1* | 9/2014 | Schultz ................... G06F 16/29 |
| | | 707/758 |
| 2014/0354630 A1* | 12/2014 | Kim ........................ G06T 17/00 |
| | | 345/419 |
| 2015/0317740 A1 | 11/2015 | Emison et al. |
| 2016/0048925 A1* | 2/2016 | Emison ..................... G06T 7/60 |
| | | 705/4 |
| 2018/0193671 A1 | 7/2018 | Chappelow et al. |
| 2019/0114717 A1* | 4/2019 | Labrie ................... G06V 20/17 |
| 2019/0378280 A1* | 12/2019 | Cho ........................ G06T 11/00 |

OTHER PUBLICATIONS

Tu et al., "A novel method of intelligent analysis of weave paten based on image processin technology," 4th International Congress on Image and Signal Processing, Oct. 2011, pp. 38-41.

Southern Research Station, Using LiDAR to Evaluate Forest landscape and health factors and their relationship to habitat of the endangered Mount Graham Red Squirrel on the Coronado National Forest, Pinaleno Mountains, Arizona. (Year: 2015).

Yao et al., "Identifying standing dead trees in forest areas based on 3d single tree detection from full waveform LiDar Data", Department of Geoinformatics, Munich University of Applied Sciences, 80333 Munich, Germany (yao, Kizytek)@hm.edu.. (Year: 2012).

* cited by examiner

AERIAL IMAGING FOR INSURANCE PURPOSES

CROSS-REFERENCE TO RELATED APPLICATIONS

This is a continuation of U.S. patent application Ser. No. 15/093,901, filed on Apr. 8, 2016 and entitled "Aerial Imaging for Insurance Purposes," now U.S. Pat. No. 10,755,357 issued on Aug. 25, 2020, which claims the benefit of U.S. Provisional Patent Application No. 62/193,732, filed on Jul. 17, 2015 and entitled "Aerial Imaging for Insurance Purposes." The entire disclosure of each of the above-identified applications is hereby incorporated herein by reference.

FIELD OF THE DISCLOSURE

The present disclosure generally relates to insurance and, more specifically, to systems and methods for insurance underwriting and/or mitigating the risk of loss.

BACKGROUND

A large number of home insurance claims are related to roof damage, or other damage (e.g., external wall damage), that was caused by elements external to the home. For example, tree damage to a home may result from high winds (e.g., hurricanes, tornadoes, downbursts, derechos, etc.), hail storms, ice storms, heavy snow, saturated soils (e.g., due to flooding), or lightning. The causes of many of these types of damage are fairly well understood. It is known, for example, that trees can be damaged by blow-over, stem failure, crown twist, root failure, branch failure and/or lightning, and that trees that have been previously damaged (e.g., by fire, wind, insects, drought, rot or decay, etc.) generally have a higher risk of failure. It is also known that certain tree species are more prone to failure than others. Typically, however, insurance companies do not account for specific risks of this sort when underwriting the risk for insurance coverage of a home. As a result, insurance coverage may be provided to individuals whose homes are at an excessively high risk of damage, and the insurer (and/or other customers) may ultimately bear a substantial portion of the resulting claim costs.

Moreover, in many cases, damage to homes could have been avoided by taking relatively low cost preventative measures, such as trimming an overhanging tree branch or removing a dead or dying tree. Nonetheless, insurance companies have historically paid claims after the damage occurs rather than paying to remove or otherwise mitigate the risk. One barrier to investing in preventative measures may be the high cost of servicing numerous, possibly small-scale and/or non-targeted risk mitigation requests. In larger-scale and/or targeted scenarios, however, risk mitigation is generally an effective way to reduce the cost of claims for both the insurance provider and the home owner. Further, home owners are typically aware that insurance companies will more likely pay out claims relating to roof or other types of damage, but may not pay for preventative maintenance. From a home owner's perspective, this approach may appear to be an unreasonable or ungainly way of dealing with risk to the home owner's property, and may inadvertently incentivize the homeowner to be complacent with respect to household maintenance.

BRIEF SUMMARY

The present embodiments may, inter alia, allow an insurance provider to more accurately and efficiently underwrite risk for a home insurance policy (or other type of insurance policy), and/or may allow the insurance provider to decrease the cost of paying claims by mitigating risk, and/or by reducing the number, frequency and/or cost of small-scale and/or non-targeted risk mitigation requests. Moreover, the present embodiments may increase satisfaction of customers of the insurance provider by preventing the hassles, and premium increases, that often accompany insurance claims.

In one aspect, a computer-implemented method may include: (1) receiving, by one or more processors, one or more digital aerial images of a property of a current or potential policyholder; (2) processing, by one or more processors, the one or more digital aerial images according to one or more image analysis techniques to determine one or more features of the property, wherein processing the one or more digital aerial images includes determining one or more features of a tree located on or near the property; (3) determining a predicted location of roots of the tree based upon the one or more features of the tree; (4) analyzing, by one or more processors, the one or more features of the property to determine a risk of damage to a structure located on the property, wherein analyzing the one or more features of the property includes analyzing at least the predicted location of roots of the tree to determine a risk of damage to a foundation of the structure; and/or (5) generating, by one or more processors and based at least in part on the risk of damage to the structure, a risk output that includes one or more of (i) an indication of whether action should be taken to mitigate the risk of damage to the structure, (ii) an indication of whether insurance coverage associated with the structure should be offered, or (iii) a measure of the risk of damage to the structure.

In another aspect, a tangible, non-transitory computer-readable medium stores instructions that, when executed by one or more processors, cause the one or more processors to: (1) receive one or more digital aerial images of a property of a current or potential policyholder; (2) process the one or more digital aerial images according to one or more image analysis techniques to determine one or more features of the property, wherein processing the one or more digital aerial images includes determining one or more features of a tree located on or near the property; (3) determine a predicted location of roots of the tree based upon the one or more features of the tree; (4) analyze the one or more features of the property to determine a risk of damage to a structure located on the property, wherein analyzing the one or more features of the property includes analyzing at least the predicted location of roots of the tree to determine a risk of damage to a foundation of the structure; and (5) generate, based at least in part on the risk of damage to the structure, a risk output that includes one or more of (i) an indication of whether action should be taken to mitigate the risk of damage to the structure, (ii) an indication of whether insurance coverage associated with the structure should be offered, or (iii) a measure of the risk of damage to the structure.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

DETAILED DESCRIPTION

Figure 1:
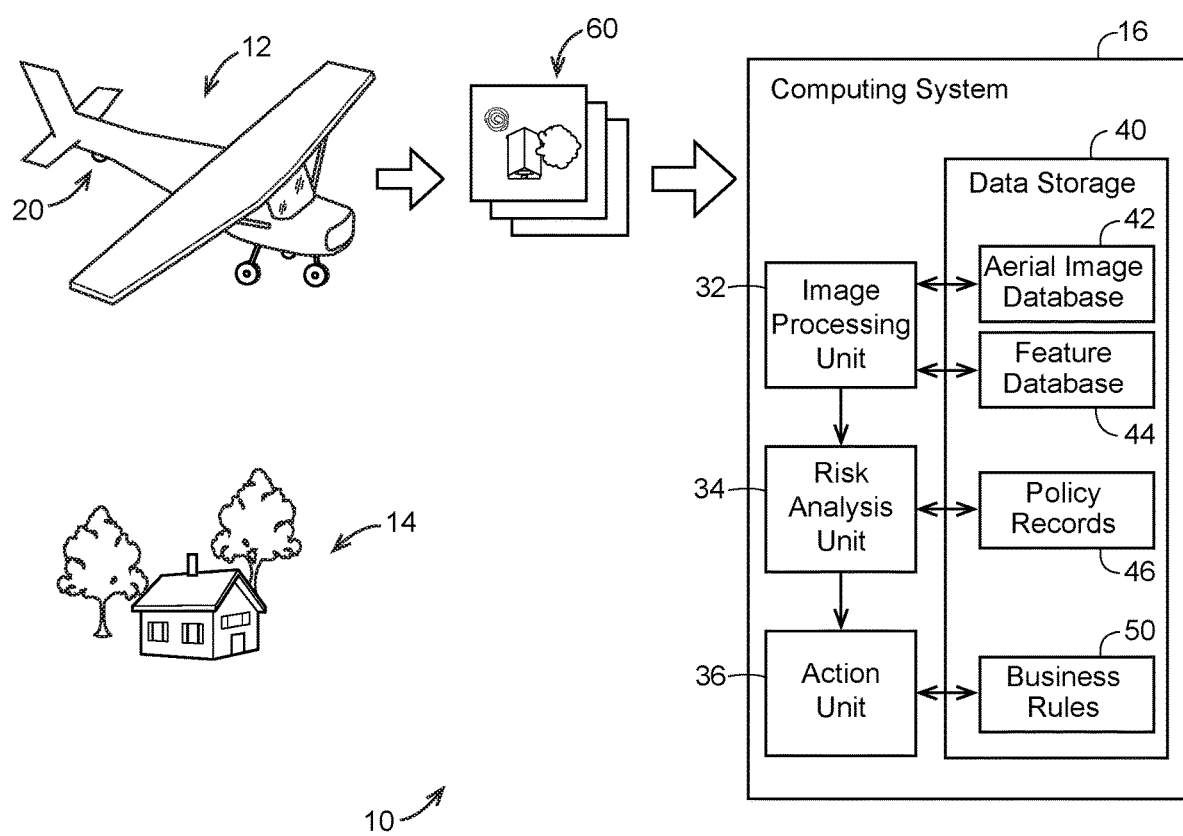
FIG. 1 depicts an exemplary environment including components associated with using aerial imaging and image analysis techniques for insurance purposes, according to an embodiment.

I. Exemplary Use of Aerial Images for Insurance Purposes

The present embodiments relate to processing aerial images of properties (e.g., homes with yards) for insurance purposes, such as underwriting risk associated with the properties and/or mitigating risk of damage to structures or objects located on the properties. The insurance may be home insurance, for example, and the aerial images may be images of the properties (e.g., properties of policyholders and/or properties adjacent to policyholder properties). The images may be taken by sensors mounted on airplanes, unmanned aerial vehicles (UAVs)/drones, satellites, and/or any other vehicle or object that is not ground-based, and may be taken from one or more angles. As used herein, and unless a more specific meaning is clearly indicated by its usage, an "image" may refer to an image that captures information within the visual spectrum (i.e., the frequency spectrum that can be perceived by the human eye), or may refer to an image that captures any other sort of information that is indicative of physical characteristics, such as elevation, spectral intensity, temperature, or reflectance, for example. Thus, the sensors used to capture the images may include still photograph cameras, video cameras, light detecting and ranging (LiDAR) devices, Synthetic Aperture Radar Interferometry (IFSAR) devices, semi-global matching (SGM) devices, spectrometers, and/or any other remote sensing device(s) capable of sensing physical characteristics of the properties. Moreover, as used herein, and unless a more specific meaning is clearly indicated by its usage, "image processing" or "image analysis" techniques may refer to data analysis techniques used for processing or analyzing visual-spectrum images, or may refer to data analysis techniques suitable for processing other image types, such as images produced by any of the other remote sensing devices noted above.

The aerial images of the properties may be processed according to any of a variety of known image analysis techniques (e.g., object recognition, image enhancement, change detection, image classification, image transformation, neural network pattern recognition, matching and classification techniques, etc.) to determine features of the properties. For example, object and/or pattern recognition may be used to determine features of trees located on the properties, such as sizes (e.g., diameters or widths) of tree branches and/or trunks, heights of trees, distances of tree trunks and/or branches from homes or other structures located on the properties, radii of root systems and/or branches (e.g., crown widths) of trees, leaf and/or branch patterns of trees, stages within the life cycles of trees, species of trees, and so on. As other examples, a spectrometer image may be analyzed to estimate tree branch densities and/or identify tree species, a LiDAR image may be analyzed to identify tree locations and/or estimate tree heights, thermal imaging and/or changes in roof reflectance may be used to determine features of snow or ice formations on roofs of homes or other structures on the properties (e.g., sizes and/or positions of snow drifts on roofs, presence of ice dams on roofs, etc.), and so on. As used herein, and unless a more specific meaning is clearly indicated by its usage, all references to determining "heights," "radii," "widths," "diameters," or any other dimensions or sizes may, depending on the embodiment, encompass determining absolute dimensions/sizes, and/or encompass determining relative dimensions/sizes (e.g., relative to other parts of a same tree, relative to a distance between a tree and a house, etc.).

Once features have been determined for a particular property, those features may be analyzed to determine a risk of damage to a home on the property, and/or a risk of damage to a different man-made structure (e.g., a commercial building, a barn, a detached garage, etc.) and/or a vehicle located on the property. If a large and/or heavy branch was identified as overhanging a roof of a house, for example, it may be determined that a high risk of damage exists. The risk may be higher still if it is determined that the overhanging branch is dead or dying (e.g., based on branch density estimates that were obtained using spectrometer images). As another example, it may be determined that a high risk of damage exists if an ice dam was identified on a roof of a house.

Other types of information may also be used to determine the risk, such as the time of year (which may be compared to an identified leaf pattern or leaf density to determine the health of a branch, etc.), environmental stressor information for the area in which the property is located (e.g., recent or current tree diseases or insect infestations, flooding/waterlogged soils, prolonged drought, damage from past ice storms or wildfires, etc.), weather forecast information (e.g., whether a hurricane, ice storm, etc., is expected) or general climate information (e.g., historical tendency to experience hurricanes, ice storms, etc.) for the area in which the property is located, a type of roof on the home or other structure (e.g., as determined by object recognition, or from the policy records of the policyholder), and so on. For example, it may be determined that a high risk of damage exists if it is determined that (1) a tree is tall enough, and near enough a house, to contact the house if the tree were to fall, (2) the tree is deciduous and has a sparse leaf pattern as compared to other trees of its species, and (3) the season is summer, late spring, or early fall (e.g., a season in which deciduous trees would be expected to retain most of their leaves).

In some embodiments, the risk is quantified based upon a likelihood of damage and/or a predicted amount of damage. The quantified risk (e.g., a risk "score") may be compared to one or more thresholds (e.g., to a threshold percent likelihood of damage and/or a threshold amount of predicted damage, or to a threshold composite risk score) for one or more of various different insurance purposes. For example, an insurance company may make the threshold comparison(s) in order to decide whether a particular home or other property can be insured (or can be insured with a particular deductible amount, etc.) in view of the insurance company's business practices/rules. As another example, an insurance company may make the comparison(s) in order to determine whether risk mitigation is advisable for a home or other property of a current or prospective policyholder. As still another example, an insurance company may make the comparison(s) in order to determine an appropriate insurance policy premium for coverage of the home or other property, either under an existing policy or for a prospective policy.

The threshold(s), and/or algorithms that are used to compute a risk score prior to the threshold comparison(s), may be configurable based upon various factors, such as past claim statistics. For example, if an insurance provider subsidizes at least a portion of certain mitigation costs, the insurance provider may choose to increase a threshold (or the threshold may be automatically increased) if an analysis of past claims and mitigation costs across a large number of policyholders suggests that the use of the techniques described herein has resulted in mitigation costs that are excessive relative to the amount of damage/claims believed to have been prevented. Generally, in some embodiments, the threshold(s) and/or algorithms may be configured, automatically or manually by the insurance company, to achieve cost-efficient risk mitigation and customer benefit, and/or to achieve a superior or optimal balance of insurance premiums (cost to policyholders) and risk exposure (cost to the insurance provider).

A measure of the risk (e.g., a risk score), and/or an indication based on the risk (e.g., an indication that risk-mitigating action is warranted, or that an individual should not be insured, etc.), may then be provided to one or more individuals and/or systems. For example, the policyholder, the policyholder's agent, and/or a third party may be informed that mitigating actions are warranted. As another example, an underwriting department or computer system of the insurer may be informed that a home on the property is not insurable, or is only insurable with a higher deductible, due to high risk. The indication/information may be included in an automated email message, a physical letter, data provided to a software application for display to a user (e.g., an application executing on a smartphone of an agent or policyholder), etc. If a metric representing the quantified risk is provided to one or more individuals (e.g., insurance agents or other insurance company employees), the individual(s) may consider the metric and decide which action, if any, to take. For example, an insurance agent or other employee may decide whether to contact the property owner regarding mitigation steps, or may decide whether to offer a policy to the property owner, etc.

By using aerial imagery/remotely sensed data to understand features of the local environment of a property, such as the proximity, species, health and/or height of trees on the property, an insurance provider may achieve one or more benefits. If used for risk mitigation, for example, the frequency and/or severity of claims may be reduced, and/or costs associated with addressing small-scale or non-targeted mitigation requests (e.g., requests for mitigation in circumstances where the corresponding mitigating actions would likely not be cost-effective) may be avoided. Moreover, customer satisfaction and customer loyalty may be improved by allowing policyholders to avoid the disruptions, inconveniences, and/or losses, and possible premium increases, that can sometimes be associated with filing claims and arranging home repairs. If used for underwriting (e.g., to determine insurability and/or premiums), the insurance provider may enhance underwriting knowledge, provide more sophisticated risk assessment, and more efficiently underwrite risk. Moreover, customers may pay premiums that are more accurately proportioned to their individual risk of loss.

II. Exemplary Environment for Using Aerial Images for Insurance Purposes

FIG. 1 depicts an exemplary environment 10 in which aerial imaging and image analysis techniques may be used for insurance purposes (e.g., to underwrite risk for an existing or potential policyholder, to mitigate risks of loss under an existing insurance policy, etc.), according to an embodiment. As illustrated in FIG. 1, the environment 10 may include an airplane 12, a property 14, and a computing system 16. While depicted in FIG. 1 (and referred to below) as an airplane, the airplane 12 may instead, in other embodiments, be a different sort of passenger or non-passenger vehicle or object that is not ground-based, such as a UAV/drone, a satellite, etc.

The airplane 12 may belong to an insurance provider, or to a third party providing an aerial imaging service to the insurance provider, for example. The property 14 may be owned by a policyholder of an insurance provider, such as an insurance company providing home insurance, for example. As used herein, however, and unless a more specific meaning is clearly indicated by its usage, the term "policyholder" may refer to an existing policyholder, or may refer to a potential policyholder (e.g., an applicant seeking insurance coverage). The computing system 16 may include one or more servers of the insurance provider, one or more servers of a third party providing a service to the insurance provider, or both. In other embodiments, the computing system 16 may include additional, fewer, or alternate components as compared to those shown in FIG. 1.

One or more sensors 20 may be mounted on the airplane 12 and configured to capture images of terrestrial structures, objects and other features from an aerial perspective. The sensor(s) 20 may include a still camera configured to capture still photographs, a video camera configured to capture a series of images over time as frames of video, a spectrometer, a LiDAR device, an IFSAR device, an SGM device, and/or any other type of remote sensing device(s) that can be mounted on the airplane 12 and used to sense/capture physical characteristics of terrestrial structures, objects and other features from an aerial perspective. As just one example, sensor(s) 20 may include multiple still cameras, a LiDAR device, and a spectrometer.

Located on the property 14 may be one or more man-made structures or other objects, such as a house, a garage, a commercial building, a barn, a vehicle, a boat, etc. Moreover, the property 14 may include any number of natural features. For example, the property 14 may include trees, bushes, ponds, creeks, and so on. The property 14 may also include hills, mounds, ravines, and/or other features that cause the elevation of the property 14 to vary, or the elevation of the property 14 may be substantially uniform.

The computing system 16 may contain a number of processing units, including an image processing unit 32, a risk analysis unit 34, and an action unit 36. Generally, in an embodiment, image processing unit 32 may process aerial images of properties using one or more image analysis techniques (e.g., object recognition, image enhancement, change detection, image classification, image transformation, neural network pattern recognition, matching and classification techniques, etc.) to determine/identify features of properties such as property 14, risk analysis unit 34 may use the determined features to quantify risks of loss associated with the properties, and action unit 36 may generally decide whether any actions should be taken, and/or determine which actions to take, based upon the quantified risks. The operation of units 32, 34 and 36 will be described in more detail below. In some embodiments, each of units 32, 34 and 36 may be (or may include) a respective set of one or more processors that executes software instructions to perform the functions described below, or the units 32, 34 and 36 may share one or more processors. Alternatively, each of some or all of the units 32, 34 and 36 may be a component of software that is stored on a computer-readable medium (e.g., a random access memory (RAM) and/or read-only memory (ROM) of the computing system 16 not shown in FIG. 1), and is executed by one or more processors of the computing system 16 to perform the functions described below.

The computing system 16 may also include a data storage 40, which may include one or more types of persistent memory. Data storage 40 may store various kinds of databases, records, and/or other information, including, for example, an aerial image database 42, a feature database 44, policy records 46 and business rules 50. Generally, in an embodiment, the aerial image database 42 may store digital aerial images of policyholder properties (e.g., in a relational database that associates each image or set of images with a particular policyholder and/or the policyholder's property), feature database 44 may store information defining different types of property features (e.g., defining various features of trees that may be located on a property), policy records 46 may store information pertaining to the policy of each policyholder (e.g., a type of construction of the policyholder's home, a type of roof on the policyholder's home, a type of siding on the policyholder's home, etc.), and business rules 50 may specify the amount of predicted risk (e.g., a threshold percent likelihood of damage, a threshold predicted amount of damage, threshold composite risk scores, etc.) that causes particular actions to be suggested and/or taken (e.g., risk mitigation measures, rejection of an application for insurance coverage, etc.). The contents of aerial image database 42, feature database 44, policy records 46 and business rules 50, according to specific embodiments and scenarios, will be described in further detail below.

While the computing system 16 may, in some embodiments, collect and process aerial images taken of many different properties, and/or collect and process aerial images from many sensor-carrying sources (e.g., multiple airplanes, drones and/or satellites), for clarity FIG. 1 illustrates only a single property (property 14) and a single sensor-carrying image source (airplane 12). In operation, the airplane 12 may fly over (though not necessarily directly over) the property 14, and may use sensor(s) 20 to capture one or more aerial images 60 of the property 14. The aerial image(s) 60 may include one or more still photographs, frames of video (e.g., if sensor(s) 20 include a video camera), spectral images (e.g., if sensor(s) 20 include a spectrometer), a digital elevation model (DEM) or other elevation-based image (e.g., if sensor(s) 20 include a LiDAR, IFSAR and/or SGM device), and so on. The aerial image(s) 60 may include images taken at a single elevation above the property 14, or images taken at two or more different elevations. Moreover, the aerial image(s) 60 may include images taken from a series of different angles of incidence with respect to the property 14. For example, a first one of aerial image(s) 60 may be taken while the airplane 12 is approaching the property 14 (resulting in an angle of incidence with respect to the property 14 that is less than 90-degrees), a second one of aerial image(s) 60 may be taken while the airplane 12 is directly overhead the property 14 (resulting in a 90-degree angle of incidence with respect to the property 14), and a third one of aerial image(s) 60 may be taken shortly after the airplane 12 has passed over the property 14 (again resulting in an angle of incidence with respect to the property 14 that is less than 90-degrees). In other scenarios, the airplane 12 may not pass directly over the property 14, and/or may circle around the property 14, etc. In some embodiments and/or scenarios, the aerial image(s) 60 may include images from two or more different sensor-carrying sources (e.g., a satellite or airplane carrying a camera, and a drone carrying a spectrometer or LiDAR device). In an embodiment, the aerial image(s) 60 are only taken, collected, and/or processed by the computing system 16 if the policyholder (e.g., the owner of the property 14) has previously "opted in" to a particular program offered by the insurance provider (e.g., a risk mitigation program, or a program that offers a premium discount in exchange for underwriting using aerial images, etc.).

The aerial image(s) 60 of the property 14 may be transferred to the computing system 16 for storage in the aerial image database 42. The transfer may be made by wirelessly transmitting the aerial image(s) 60 to the computing system 16 from a communication device coupled to the sensor(s) 20, by manually transferring the aerial image(s) 60 from the sensor(s) 20 to another device with memory (e.g., a smartphone, tablet, phablet, USB memory stick, etc.) and then physically coupling the device to the computing system 16, or in any other suitable manner. In some embodiments, the aerial image(s) 60 may be transferred from the airplane 12 to the computing system 16 in a less direct manner. For example, a first device with memory (e.g., a smartphone, tablet, phablet, USB memory stick, etc.) may be used to collect the aerial image(s) 60 from the sensor(s) 20, and to transfer the aerial image(s) 60 to a server of a third party (not shown in FIG. 1). The third party server may then send the aerial image(s) 60 to the computing system 16 over one or more networks (e.g., one or more wired and/or wireless local area networks (LANs), and/or one or more wired and/or wireless wide area networks (WANs) such as the Internet), for example.

Once the aerial image(s) 60 is/are received (directly or indirectly) from the airplane 12, the aerial image(s) 60 may be stored in aerial image database 42. Image processing unit 32 may then process the aerial image(s) 60 to identify one or more features of the property 14. Image processing unit 32 may process the aerial image(s) 60 using any suitable image analysis techniques known in the art. In some embodiments, for example, image processing unit 32 uses techniques that are currently employed in the forest industry to identify tree species and to assess the health of timber stands using satellite imagery/data. Depending upon the scenario (e.g., the physical attributes of the property 14) and the embodiment, various different types of features may be identified using the image analysis techniques. In some embodiments and scenarios, image processing unit 32 may identify one or more features of one or more trees depicted (or otherwise represented, e.g., by elevation or spectral data) in the aerial image(s) 60. The features may include features that are inherent to the trees themselves, and/or features of the trees relative to other objects or structures on the property 14. For example, image processing unit 32 may identify a height of a tree (e.g., relative to a distance between the tree and a house or other structure in the image(s) 60). As another example, image processing unit 32 may identify an orientation of a tree branch above a roof in the image(s) 60 (e.g., identify whether the branch is directly above the roof, a height of the branch above the roof, etc.). In other examples, image processing unit 32 may identify a distance between the tree trunk (e.g., the centroid of a tree crown as viewed from above) and a wall or roof of a house or other structure in the image(s) 60, a distance between a tree branch and a chimney in the image(s) 60, an average or maximum diameter of the tree (e.g., "crown width"), a diameter and/or length of a particular branch on the tree, a leaf color of the tree, etc. In some embodiments, the image analysis techniques employed by image processing unit 32 may include pattern recognition techniques. If sensor(s) 20 include a camera, and airplane 12 is instead a low-flying drone, for example, image processing unit 32 may use pattern recognition techniques to identify a leaf pattern and/or a bark pattern of a tree. Image processing unit 32 may also use masking techniques to identify which tree portions overhang a house or other structure or object. If the aerial image(s) 60 include multiple images, image processing unit 32 may use an image analysis technique that takes advantage of the additional information and/or redundancy to enhance completeness, accuracy and/or precision of the identified features.

Image processing unit 32 may use some of the identified features of the property 14 to determine other features. For example, image processing unit 32 may initially determine that a branch of a tree on the property 14 has a particular width, length and/or cross-section area (as viewed from above), and based at least in part upon those properties estimate that the branch has a certain mass. As another example, image processing unit 32 may initially determine that a tree on the property 14 has a particular height, branch width and leaf pattern, and based upon those properties determine that the tree belongs to a particular species. To continue with the latter example, image processing unit 32 may use the determined tree height and tree species to estimate locations of roots of the tree (e.g., to estimate a root radius).

In some embodiments and scenarios, image processing unit 32 may also determine features of other objects on the property 14, such as a snow or ice formation on a roof of a structure (e.g., a house) located on the property. For example, image processing unit 32 may identify a snow drift on a house roof, and determine an area covered by the snow drift (and/or an average thickness/depth of the snow drift, etc.). Image processing unit 32 may then use the determined area or other measurement(s) to estimate a mass of the snow drift.

In some embodiments and/or scenarios, image processing unit 32 may also determine one or more properties of a house or other man-made structure on the property 14. For example, image processing unit 32 may use object and/or pattern recognition to determine a type of roof on a structure, to determine a type of construction (e.g., brick, brick veneer, etc.), to determine a size of a structure, to identify a chimney on a roof, etc. In some embodiments, however, these characteristics of the property 14 are stored in policy records 46 and need not be determined by image processing unit 32.

To assist in determining features of the property 14, image processing unit 32 may access the feature database 44, which may store information that may be used for recognition/classification of various feature types. For example, the feature database 44 may store information specifying which leaf patterns, dimensions or ranges of dimensions (heights, crown widths, etc.), leaf or bark colors, spectral "signatures," etc., correspond to various different tree species. As other examples, feature database 44 may store information specifying expected root radii (e.g., tree height multipliers) for different tree species, information specifying which dimensions, shapes, or other characteristics correspond to chimneys, and so on.

In some embodiments where the aerial image(s) 60 include at least one spectrometer image (e.g., where the sensor(s) 20 on airplane 12 include a spectrometer, or where the spectrometer is mounted on a different airplane or a drone, etc.), image processing unit 32 may analyze the spectrometer image(s) to determine a density of at least a portion of a tree (or a density of another object) on the property 14. For example, image processing unit 32 may use an image from camera 20 to determine a size of a branch, use the spectrometer image to estimate a density of the branch, and then use the size and density to calculate a mass of the branch. An estimated density may also be used to determine other features besides mass, such as whether a branch (or entire tree) is healthy, dead, or dying, for example. Information specifying which properties or characteristics of the spectrometer image correspond to various different densities, and/or which properties or characteristics correspond to various different states of health, may be stored in feature database 44, for example.

In some embodiments where the aerial image(s) 60 include at least one LiDAR, IFSAR or SGM image (e.g., where the sensor(s) 20 on airplane 12 include a LiDAR, IFSAR or SGM device, or where the LiDAR, IFSAR or SGM device is mounted on a different airplane or a drone, etc.), image processing unit 32 may analyze the LiDAR, IFSAR or SGM image to determine a height of a tree (or other object or formation) on the property 14. Moreover, by using a DEM derived from LiDAR, IFSAR or SGM data, image processing unit 32 may be able to determine relative elevations of various portions of the property 14, which may be relevant to risk. For example, a tree top may be 35 feet above the ground level of a house on the property 14, and the tree may be only 25 feet away from the house. Without elevation data, this may indicate that the tree could fall on the house if the tree fails. If the tree is located on a hill that is 20 feet above the ground level of the house, however, then the tree is only 15 feet tall (i.e., 35 feet minus 20 feet), and it is highly unlikely that the tree would strike the house if the tree were to fall.

Image processing unit 32 may provide data indicating the determined feature(s) to risk analysis unit 34, which may analyze the feature(s) to determine a risk of damage to at least a portion of the property 14 (e.g., damage to a roof, wall or other portion of a home located on the property 14). Risk analysis unit 34 may also utilize certain types of a priori knowledge to determine risk. This knowledge may be incorporated as rules stored in data storage 40, or another memory not shown in FIG. 1. For example, risk analysis unit 34 may access rules specifying that certain tree species are more prone to failure than others (either generally, or with respect to particular conditions such as high winds, wet soils, lightning, insect infestations, etc.), due to factors such as typical tree height, concentration of foliage near the top of the tree, shallow-rootedness, etc. As other examples, risk analysis unit 34 may access rules specifying that dead branches having at least a certain mass are prone to cause at least a certain amount of damage (possibly depending on the type of roof construction), rules specifying that trees typically have a particular "wind-throw" range in which they may cause damage if they uproot or snap (e.g., a lateral range equal to 110% of the tree height), and so on. In some embodiments, risk analysis unit 34 may determine the date and/or season associated with the aerial image(s) 60 in order to assess risk (e.g., to determine whether sparse leaves are appropriate to the season). In other embodiments, risk analysis unit 34 may operate according to algorithms that assume a particular season or time frame (e.g., summer), and only processes aerial images that are taken during that season or time frame.

In addition to the determined features and a priori information described above, risk analysis unit 34 may analyze climate data for the geographic area that includes the property 14, weather forecast information for the geographic area that includes the property 14, insect infestation or tree disease information for the geographic area that includes the property 14 (e.g., information provided by the United States Department of Agriculture), seasonal information (e.g., the current date and/or season), and/or other types of information relevant to risk. Some more specific examples of these additional types of information are discussed below, in connection with FIG. 4.

Ice dams present one example in which various sources of information may be used to detect risk. For example, a server in computing system 16 (or elsewhere) may implement a weather monitoring algorithm that searches for geographic areas having conditions conducive to ice dams. The algorithm may search for areas that had a threshold amount of snowfall in the preceding X days, and currently have a temperature within a certain range that is below 32 degrees Fahrenheit (but would still allow snow to melt near roof peaks before freezing again near the roof edges/eaves), for example. When such an area is identified, an aerial survey (e.g., a drone survey) may be initiated for that area. Aerial images of the area (e.g., thermal images and/or images that provide reflectance information) may be captured, for example, and those images may be analyzed to determine whether ice dams exist (or are likely to exist, etc.) for individual homes in the area.

Wildfires present another example in which various sources of information may be used to detect risk. For example, a server in computing system 16 (or elsewhere) may implement a weather monitoring algorithm that searches for geographic areas having conditions conducive to wildfires. The algorithm may search for areas that have had no precipitation for the preceding X days (and possibly have windy conditions, etc.), for example. When such an area is identified, an aerial survey (e.g., a drone or airplane survey) may be initiated for that area. Aerial images of the area (e.g., camera and/or LiDAR images) may be taken, for example, and those images may be analyzed to determine features such as the distance that trees are set back from individual homes. The distances may be compared to threshold set back distances stored in business rules 50 (or elsewhere) to determine whether particular homes are at high risk of fire damage, for example. Other features may also be determined in order to assess wildfire risk, such as whether trees on a particular property are of a species that is more likely to catch fire (and/or more likely to spread the wildfire, etc.), for example.

In various embodiments, risk analysis unit 34 may generate different kinds of risk information based upon the analyzed feature(s) and other information. For example, risk analysis unit 34 may estimate a likelihood that damage will occur to some portion of the property 14, such as a percent chance that a branch overhanging a roof will fall on and damage the roof, a percent chance that a dead or dying tree will fall over and strike a roof or wall, a percent chance that a branch in close proximity to a chimney will cause damage due to backdraft, etc. In some embodiments, risk analysis unit 34 determines the likelihood as a binary indicator of the likelihood of damage (e.g., "damage likely" or "damage not likely").

In addition to, or instead of, estimating a likelihood of damage, risk analysis unit 34 may predict an amount of damage, such as an extent (e.g., square feet of roof or wall that may be damaged) and/or a cost of the damage should damage occur, for example. Moreover, in some embodiments, risk analysis unit 34 may determine how imminent the damage is (e.g., likely within three months, likely within one year, likely within five years, etc.). Risk analysis unit 34 may also make use of information from policy records 46, and/or other information determined by image processing unit 32, to estimate the cost. For example, risk analysis unit 34 may estimate cost using knowledge of roof materials, roof shape, standard replacement costs, standard repair costs, policy provisions concerning depreciated or actual costs, and so on. In other embodiments, some of these factors (e.g., roof shape) are instead determined via object recognition and/or other image analysis techniques using the aerial image(s) 60. The cost may be determined by estimating a hypothetical claim based on the predicted damage, or in any other suitable manner.

In some embodiments, for each estimated likelihood of damage and/or each predicted damage amount, risk analysis unit 34 generates a descriptor indicating the nature of the potential damage. If risk analysis unit 34 determines that a dead, heavy branch is directly above a roof of a home on the property 14, for example, risk analysis unit 34 may generate output data representing the set [30%, $5,000, "overhanging dead branch"] to indicate that the branch, if not trimmed back, creates a 30% chance of causing about $5,000 in damage to the home. The specificity of the descriptor may vary according to the embodiment. For example, the descriptor for the above example may be "dead branch overhanging southwest corner of home," "overhanging dead branch," "branch damage," "tree damage," "roof damage," and so on. In some embodiments, the descriptor may be a code (e.g., an alphanumeric code) indicating a known category of damage.

Risk analysis unit 34 may provide the risk information (e.g., damage likelihood, damage amount, and/or descriptor) to action unit 36, which may in turn apply business rules 50 to calculate one or more metrics reflecting risk level, to determine whether a home or other structure on the property 14 is insurable, and/or to determine whether mitigating measures should be prescribed. If determining insurability or whether mitigation should be prescribed, business rules 50 may specify one or more thresholds. If determining insurability, for example, business rules 50 may specify that a house on property 14 is not insurable (or requires a higher deductible, etc.) if a predicted cost exceeds $5,000 for tree damage and an estimated likelihood of such damage exceeds 10%. As another example, if determining whether risk mitigation should be undertaken, business rules 50 may specify that mitigation is advisable if a product of the predicted amount of damage and the estimated likelihood of damage (i.e., damage×probability) exceeds a particular threshold. As a more specific example, business rules 50 may specify that mitigation is advisable if the product of the predicted cost of damage and the estimated likelihood of damage equals or exceeds $400, e.g., such that each of the combinations $4000/10% ($4000×0.10=$400), $8000/5% ($8000×0.05=$400), and $16,000/2.5% ($16000×0.025=$400) would just reach the threshold. Action unit 36 may also utilize thresholds that vary based on the expected cost of mitigation. For example, business rules 50 may specify that mitigation is to be prescribed only if a hypothetical claim for imminent damage exceeds the expected mitigation costs (or, alternatively, exceeds the portion of mitigation costs, if any, that the insurance provider would subsidize) by $4,000. Thus, a hypothetical claim estimate of $5,000 or more for falling branch damage may trigger mitigating action if the cost of tree trimming is expected to be $1,000 or less.

As yet another example, if determining risk level (e.g., for insurance premium calculation and/or determining insurability), business rules 50 may specify that the product damage×probability is to be entered into a multi-factor algorithm for determining a composite risk score, and may further specify that the composite risk score is to be compared to a series of thresholds to determine a risk level/ rating. In other embodiments, the damage likelihood(s) and/or damage amount(s) determined by risk analysis unit 34 may serve as risk metrics in and of themselves, and action unit 36 may merely compare the damage likelihood(s) and/or damage amount(s) to the threshold(s) specified by business rules 50 to determine the risk level.

The business rules 50 may be configurable and updateable. If the insurance provider subsidizes certain mitigation costs, for example, the threshold(s) and/or the metric calculation algorithms included in business rules 50 may be adjusted based on an analysis of past mitigation costs and/or past claims (e.g., mitigation costs and/or claims associated with the policyholder associated with the property 14, and/or one or more other policyholders). As a more specific example, a threshold likelihood of damage, a threshold predicted dollar amount of damage, and/or a threshold composite risk score may be increased if the cost (to the insurance provider) of past mitigation measures has been excessive relative to the amount of damage and/or relative to the number of claims believed to have been prevented by those mitigation measures. The business rules 50 may be manually configured by one or more users of the computing system 16 (e.g., employees of the insurance provider), or configured by a processing unit (not shown in FIG. 1) that automatically sets the appropriate thresholds and/or algorithms based upon processing of past claims data and past mitigation cost data for one or more policyholders (e.g., based upon data stored in policy records 46).

In some embodiments, business rules 50 may also specify configurable parameters that dictate when an aerial survey of one or more properties should be initiated. For example, business rules 50 may specify that areas having particular geographic characteristics (e.g., high wind areas, drought-prone areas, etc.) should be surveyed with a particular frequency, and/or specify that surveys should be conducted in particular timeframes (e.g., in anticipation of hurricane season for those geographic areas historically affected by high winds, etc.). In some embodiments, an aerial survey is initiated after a claim is filed. If a policyholder files a claim because a tree branch falls on his or her home, for example, the insurance provider may at that time initiate an aerial survey (or use existing aerial imagery of the policyholder's property) as described herein in order to determine whether mitigating action should be taken to prevent further damage, to determine a more accurate risk profile and/or premium for the policyholder, etc.

In addition to calculating metrics and/or determining whether mitigating or other action (e.g., rejecting insurance coverage) is needed, action unit 36 may provide notifications of prescribed actions and/or the estimated level of risk. If applicable risk thresholds have been exceeded, for example, action unit 36 may cause the computing system 16 to send an indication that mitigating action is suggested with respect to the property 14, or an indication that home insurance coverage cannot or should not be provided to the owner of the property 14 (or can only be provided with a higher deductible, etc.). The indication(s) may be sent to an insurance agent serving the owner of the property 14 (or another employee of the insurance provider), to the property owner, and/or to a third party (e.g., a third party capable of performing or arranging mitigation services such as tree trimming, tree removal, snow or ice removal, etc., or a third party capable of performing a more thorough inspection of the property 14). The indication(s) may be sent via email, an SMS text message, and/or any other suitable communication medium or media. In one embodiment in which the computing system 16 is, or includes, one or more servers of a third party, the action unit 36 may transmit the indication(s) to a server of the insurance provider.

In some embodiments, action unit 36 may cause the computing system 16 to send one or more risk metrics (e.g., risk scores) generated by action unit 36 or risk analysis unit 34 to an employee of the insurance provider, the property owner, and/or a third party. The recipient may then consider the metric(s) in deciding which action to take (e.g., initiating tree trimming or other mitigating activities, suggesting risk mitigation to the property owner, allowing or not allowing an insurance application to move forward, etc.), or whether to take any action at all.

In various embodiments, the individual(s) may or may not be provided with information detailing the nature of the risk. For example, the individual(s) may be provided with a relatively specific notice such as "heavy, dead branch above roof," "branch blocking chimney," or "unhealthy tree in southwest corner of lot," a less specific notice such as "tree trimming suggested" or "remove ice dam on roof," or a very general notice such as "risk score=82," "mitigation needed," "high deductible," or "property not insurable." The information may be the same as, or derived from, the descriptor generated by risk analysis unit 34 (discussed above), for example.

The manner in which the risk information provided by action unit 36 is acted upon, if at all, may depend upon the nature of the information, the recipient(s) of the information, and/or the general business practices of the insurance provider. If action unit 36 causes the computing system 16 to send an insurance agent an indicator that mitigation is suggested for the property 14, for example, the agent may call the policyholder to discuss the matter, or prepare a personalized email to the policyholder, etc. The agent may be authorized by the insurance provider to offer to subsidize some or all of the cost of mitigation services (e.g., tree trimming), or to offer a premium discount if the mitigation services are performed, for example. In other scenarios, the agent may not be authorized to subsidize or otherwise incentivize any mitigation services, but may nonetheless inform the customer of the risk and suggest mitigation when mitigation is suggested/indicated by action unit 36. In either case, mitigation may be fully voluntary on the part of the policyholder, regardless of the level of predicted risk.

In some embodiments, action unit 36 may generate a message indicating that mitigating action is needed, and send that message to another computer system or software tool that takes the appropriate action. For example, action unit 36 may send a particular code to a computer system responsible for billing, and in response the billing computer system may add a message to a billing statement of the property owner. The message may explain the type of mitigation action to be taken (e.g., "Please consider hiring a tree trimming service to do X"), and possibly offer to subsidize at least a portion of the cost of the action (e.g., "If this action is taken, Insurance Company A agrees to pay for 50% of the cost of the service."), for example.

In some embodiments where the computing system 16 is a third party system, certain components shown in FIG. 1 are not included in computing system 16. For example, policy records 46, business rules 50, and action unit 36 may be included in a computing system of the insurance provider rather than the computing system 16. In one such embodiment, the third party may provide the output of risk analysis unit 34 (e.g., an estimated likelihood and/or a predicted amount of damage) to a computing system (e.g., a server) of the insurance provider via one or more wired and/or wireless networks, where action unit 36 may operate on that output according to any of the embodiments described above.

III. Exemplary Aerial Image

Figure 2:
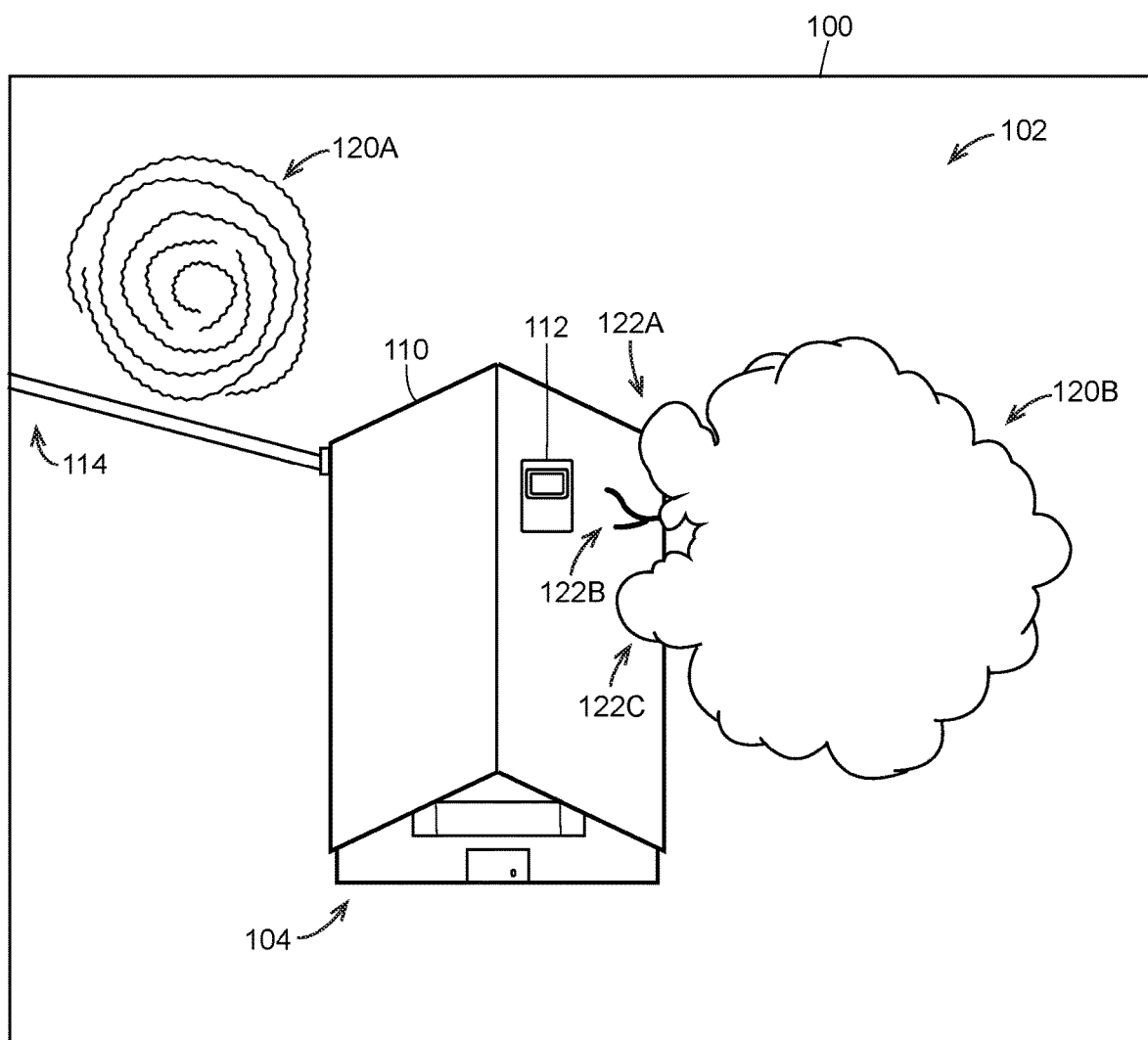
FIG. 2 depicts an exemplary aerial image that may be processed to determine risks associated with a property, according to one scenario.

Some specific examples of the techniques described herein will now be provided in more detail in connection with FIG. 2. For ease of explanation, the examples described below in connection with FIG. 2 make reference to components of the exemplary environment 10 of FIG. 1. It is understood, however, that different systems and/or components may be used to implement the below techniques. FIG. 2 depicts an exemplary aerial image 100 that may be processed to determine risks associated with a property, according to one scenario. The aerial image 100 may be one of aerial image(s) 60 of the property 14 in FIG. 1, for example. In the example scenario of FIG. 2, aerial image 100 is a camera image that depicts a property 102 on which is located a house 104, the house 104 having a roof 110 with a chimney 112, with the house 104 being coupled to a set of utility lines 114 (e.g., power and/or telephone lines). Also located on the property 102, in this example scenario, are a tree 120A and a tree 120B. Depending upon the magnification of the aerial image 100 and the bounds of the property 102, the aerial image 100 may show less than the entire property 102, and/or show portions of land, trees, man-made structures, etc., that are not located on (or are only partially located on) the property 102. The aerial image 100 may have any of various suitable digital data formats, such as JPEG, TIFF, PNG, GIS raster or vector, Hierarchical Data Format (HDF), etc.

In one example embodiment and scenario, image processing unit 32 may process the aerial image 100 to identify various features associated with the tree 120B. For example, image processing unit 32 may identify branches 122A, 122B and 122B as branches overhanging the roof 110, and/or determine one or measures of the size of the branches 122A, 122B and 122B (e.g., cross-sectional area as seen from above, and/or branch diameter and length, etc.). As compared to branch 122B, the sizes of the branches 122A and 122C may be more roughly estimated due to the obscuring effect of the leaves. Image processing unit 32 may also determine the distance between each of the branches 122A, 122B and 122C and the roof 110, particularly if one or more other camera images provide a better view of the elevation of various parts of the property 102 (or if a LiDAR image/information indicates the elevations of the branches 122A, 122B and 122C and the roof 110, etc.). Further, image processing unit 32 may identify features of leaves on the tree 120B and/or the tree 120A. For example, image processing unit 32 may determine that branches 122A and 122C are heavily leaved, while branch 122B has no (or very few) leaves. Image processing unit 32 may also identify the size and/or mass of dead or dying portions of the tree 120B and/or the tree 120A (e.g., using a spectrometer image of the tree portions, and/or using leaf density on the tree portions).

Using these features, risk analysis unit 34 may determine a risk of loss to the house 104. For example, risk analysis unit 34 may compare the amount or density of leaves on branch 122B to the amount or density of leaves on other branches of the tree 120B (or on other trees), and/or consider the amount or density of leaves in view of the current date or season, to determine that branch 122B is a dead branch, and then estimate a percent likelihood that the branch will fall within a certain time frame (e.g., one year, or more generally within the near future, etc.). Risk analysis unit 34 may also, or instead, use the size and/or mass of the branch 122B, the orientation of the branch 122B with respect to the roof 110 (e.g., distance above the roof 110), and/or knowledge of the type of construction, shape, etc. of the roof 110 to predict the amount of damage should the branch 122B fall.

As another example, image processing unit 32 may estimate the distances from the centers or trunks of the trees 120A and 120B to the walls of the house 104 and, if the aerial image 100 is not taken from directly overhead the property 102 (or if additional camera images from different angles are available, or if LiDAR information is available, etc.), also estimate the heights of the trees 120A and 120B. Image processing unit 32 may also determine an amount or density of leaves on the trees 120A and/or 120B, and/or analyze one or more spectral images captured by a spectrometer to determine densities of exposed portions of the trees 120A and/or 120B (e.g., branch 122B). Risk analysis unit 34 may then use the determined distances and tree heights (and possibly other parameters, such as a "wind-throw factor" representing how far a tree may be thrown, relative to the tree's height, if the tree is knocked down by wind) to determine whether tree 120A and/or tree 120B could land on the house 104 if they were to fall over. For example, risk analysis unit 34 may determine that the house 104 is not at risk of being struck by a particular tree, regardless of that tree's health, so long as the house 104 is at least X feet away from the tree, with X being equal to the height of the tree multiplied by a wind-throw factor (e.g., 1.1). Risk analysis unit 34 may also analyze the amount or density of leaves on the trees 120A and 120B (possibly with information indicating the season, such as the current date), and/or the branch density information, to determine the health of the trees 120A and 120B (e.g., healthy, dead or dying). If the image processing unit 32 determined the species of the trees 120A and 120B (e.g., based on leaf patterns and/or spectral signatures, along with information in feature database 44), risk analysis unit 34 may also use the species when determining the health of the trees 120A and 120B. For example, risk analysis unit 34 may incorporate algorithms that take into account the different points in the season at which healthy trees of different species tend to lose their leaves (if at all). If tree 120A is a conifer that retained its needle-like leaves in winter, while tree 120B is an oak tree that had lost most of its leaves by that point, for example, risk analysis unit 34 may determine that both trees 120A and 120B are healthy trees.

As another example, image processing unit 32 may estimate the height of the tree 120A, as well as the distance between the tree 120A and the utility lines 114. Risk analysis unit 34 may then use the distance and height (and possibly a wind-throw factor, and/or other features determined by image processing unit 32, such as apparent health of the tree 120A, age of the tree 120A, etc.) to determine a likelihood that the tree 120A will fall and damage the utility lines 114.

As another example, image processing unit 32 may estimate the dimensions of a snow and/or ice formation (e.g., a snow drift) on the roof 110 (not shown in FIG. 2), and estimate the mass of the formation based on those dimensions. Risk analysis unit 34 may then use the mass and/or dimensions to determine a likelihood that the formation will cause damage to the house 104 (e.g., roof collapse, backdraft, etc.).

As yet another example, image processing unit 32 may determine the species, and estimate the heights, of the trees 120A and 120B, and use that information (and possibly information in feature database 44, such as typical root system radius to tree height ratios for various tree species) to estimate the dimensions of underground root systems of the trees 120A and 120B. Image processing unit 32 may also estimate the distances between the centers of the trees 120A and 120B and the perimeter/walls of the house 104. Risk analysis unit 34 may then use the estimated root system dimensions, and the distances to the house 104, to determine a likelihood that the root systems will cause damage to the house 104 (e.g., damage to the foundation). Alternatively, or additionally, if the image 100 includes one or more neighboring houses or other structures, risk analysis unit 34 may determine a likelihood that the root systems will cause damage to those neighboring structures. Alternatively, or additionally, if risk analysis unit 34 has access to information specifying locations of underground utility lines (e.g., water pipes, electrical lines, sewer lines, etc.), risk analysis unit 34 may also determine a likelihood that the root systems will cause damage to those utility lines.

In any of the above examples, if the estimated likelihood and/or damage amount exceed(s) one or more thresholds in business rules 50, or if one or more metrics calculated based on the likelihood and/or amount (e.g., a risk score) exceed the threshold(s), action unit 36 may cause a message to be delivered to the appropriate person and/or entity, as was described above in connection with FIG. 1 according to various embodiments. Alternatively, the metrics may be used to determine a risk rating and insurance premium, as was also described above in connection with FIG. 1.

IV. Exemplary Model Developed Using Aerial Imagery

Figure 3:
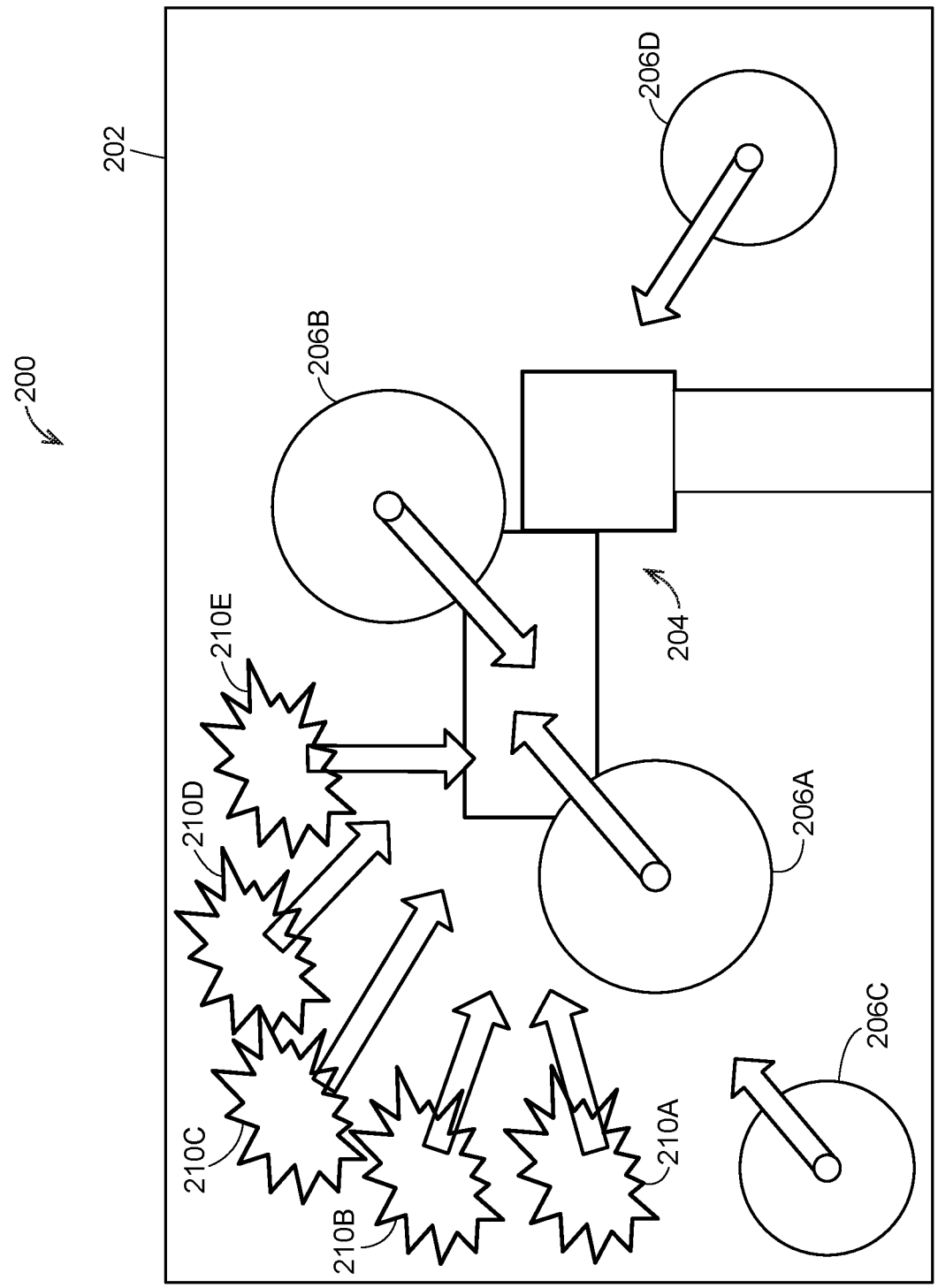
FIG. 3 depicts an exemplary model of a property developed based on aerial imagery and image analysis techniques, according to one embodiment and scenario.

FIG. 3 depicts an exemplary model 200 of a property 202 developed based on aerial imagery and one or more image analysis techniques, according to one embodiment and scenario. Referring to FIG. 1, the model 200 may be generated by image processing unit 32 based on processing of aerial image(s) 60, for example. In some embodiments, the model 200 may be displayed to a user in a form similar to that shown in FIG. 3. In other embodiments, the model 200 is not displayed to any user, and FIG. 3 is only an abstract representation of the various features of the property 202 that were determined by image processing unit 32.

In the example scenario of FIG. 3, image analysis techniques have been used to determine that the model 200 includes a house 204, four deciduous trees 206A through 206D, and five coniferous trees 210A through 210E. The differing sizes (e.g., radii) of the trees 206 and 210 may represent crown widths that were determined by processing LiDAR or camera images, for example. Each arrow may represent the wind-throw range of the corresponding tree, where the wind-throw range may be equal to the height of the tree (also determined via image processing) multiplied by a wind-throw factor that is typically greater than one (e.g., 1.1). The wind-throw range may be determined by a risk analysis unit similar to risk analysis unit 34 of FIG. 1, for example. In the example scenario of FIG. 3, it is seen that deciduous trees 206A, 206B and coniferous tree 210E are all within wind-throw range of the house 204, while deciduous trees 206C, 206D and coniferous trees 210A-210D are not within wind-throw range. It is also seen in FIG. 3 that branches of the deciduous trees 206A and 206B overhang the roof of the house 204. The identification of the trees within wind-throw range of the house 204, and of the trees with branches overhanging the house 204, may be accomplished using a risk analysis unit similar to risk analysis unit 34 of FIG. 1, for example. Damage probabilities, damage estimates, and/or risk metrics may then be generated, and one or more actions may be taken (e.g., sending notifications, initiating mitigating activities, etc.), as described above in connection with risk analysis unit 34 and action unit 36.

V. Exemplary Method for Using Aerial Images for Insurance Purposes

Figure 4:
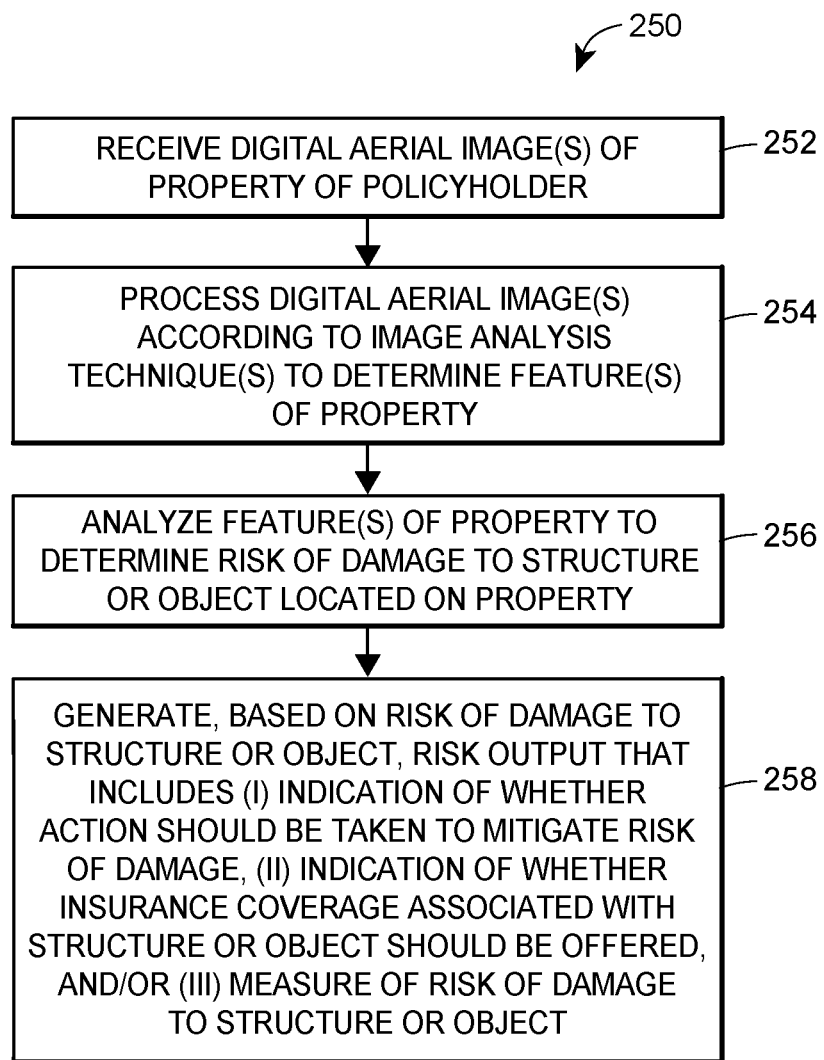
FIG. 4 depicts a flow diagram of an exemplary method for using aerial imagery and image analysis techniques for insurance purposes, according to an embodiment.

FIG. 4 depicts a flow diagram of an exemplary method 250 for using aerial images and image analysis techniques for insurance purposes, according to an embodiment. In one embodiment, the method 250 may be implemented in (e.g., performed by one or more processors of) one or more servers or other computer devices of a computing system, such as one or more servers or other computer devices within computing system 16 of FIG. 1, for example.

In the method 250, one or more digital aerial images of a property of a policyholder may be received (block 252). Block 252 may be performed by an image processing unit such as image processing unit 32 of FIG. 1, for example. The property in the image may be a residential or commercial property, for example. The policyholder may be a person or other entity, and may be a current policyholder or a potential policyholder. The digital aerial image(s) may include one or more images obtained using a sensor mounted on an airplane, a sensor mounted on a satellite, and/or a sensor mounted on a drone, for example. The sensor(s) may include a still camera, a video camera, and/or any other device capable of remotely capturing physical characteristics of structures, land, trees, etc. (e.g., a LiDAR device, a spectrometer, an SGM device, an IFSAR device, etc.). If multiple images are included, some of the images may have been captured by different types of sensors (e.g., one by a camera, one by a LiDAR device, etc.) and/or by sensors on different vehicles or objects (e.g., one by a first drone, one by a second drone, one by a satellite, etc.). Moreover, some of the images may be images (e.g., camera images) that were captured with different angles of incidence with respect to the property.

The digital aerial image(s) may be processed according to one or more image analysis techniques suitable to the type(s) of received image(s)/data in order to determine one or more features of the property (block 254). Block 254 may be performed by an image processing unit such as image processing unit 32 of FIG. 1, for example. The image analysis technique(s) (e.g., object recognition, object detection, feature extraction, image classification, change detection, etc.) may be used to determine one or more features of a tree that is located on or near the property. For example, an object detection/identification technique (e.g., operating on LiDAR image data) may be used to detect/identify a particular tree, and other image analysis techniques may then be used to determine a size of at least a portion of the tree (e.g., tree height, crown width, branch length, branch width, etc.), a species of the tree, an orientation of a portion of the tree with respect to the structure or object, etc. As another example, the image analysis technique(s) may be used to determine one or more features of leaves on the tree (e.g., density or sparseness of the leaves, color of the leaves, etc.).

In some embodiments and/or scenarios, other types of features may also, or instead, be determined. For example, the image analysis technique(s) may be used to determine features of the structure or object on the property (e.g., a type of roof on a house). As another example, the image analysis technique(s) may be used to determine features of an ice or snow formation on a house or other structure (e.g., analyzing a thermal image to help determine the presence and/or location of an ice dam or snow drift on a roof of a house).

In some embodiments and/or scenarios, one or more additional features may be determined based on an initial set of determined features. For example, a stage of a life cycle of a tree may be determined using the species, height and/or the crown width of the tree. As another example, a location of roots of a tree (e.g., a root system radius) may be predicted using the species, height and/or the crown width of the tree. Moreover, the image analysis technique(s) may include a pattern recognition technique. For example, tree species may be determined at least in part by using a pattern recognition technique to analyze a camera image in order to identify a pattern of leaves on the tree, and/or to identify a pattern of branches on the tree. Alternatively, or additionally, a spectrometer image may be analyzed using a suitable image analysis technique in order to determine density of at least a portion of the tree, or to determine tree species, etc.

The property feature(s) may then be analyzed to determine a risk of damage to a structure or object located on the property (block 256). Block 256 may be performed by a risk analysis unit such as risk analysis unit 34 of FIG. 1, for example. As one example, the feature(s) may be analyzed to determine a risk of damage to a house on the property. Alternatively, the feature(s) may be analyzed to determine a risk of damage to a commercial building (e.g., store, warehouse, etc.) on the property, to a vehicle on the property (e.g., an automobile or boat), or to any other insured or insurable structure or object located on the property.

The risk of damage may be determined in various different ways, and based on various different features, according to different embodiments and scenarios. If the features determined at block 254 include both tree height (e.g., as determined based on processing of a LiDAR, IFSAR or SGM image, and/or camera images taken at different angles of incidence) and distance of the tree from a structure or object, for example, the height and distance may be analyzed to determine a risk of the tree falling on the structure or object. The height may be compared to the distance multiplied by a "wind-throw factor," for example. As another example, if the determined features include a density of a tree branch or tree trunk (e.g., as determined based on processing of a spectrometer image), the density may be analyzed to determine a risk of the tree branch, or the entire tree, falling and striking the structure or object. As another example, if the determined features include a life cycle stage of a tree, the life cycle stage may be analyzed (e.g., along with tree species and/or tree size) to determine a risk of the tree dying and falling on the structure or object (e.g., to more accurately determine timing of tree death/failure). As another example, if the determined features include one or more features of leaves on a tree (e.g., sparseness), and the time of year when the digital aerial image(s) was/were taken is determined (e.g., the date, season, etc.), the leaf feature(s) may be analyzed in view of the time of year to determine a risk of the tree dying or deteriorating and falling on the structure or object. As yet another example, if the determined features include a type of roof of a structure on the property (e.g., construction and/or material type), the roof type may be analyzed along with other features (e.g., orientation of a branch with respect to the roof) to determine a risk of the branch falling on the roof and causing significant damage. As still another example, if the determined features include a predicted location of roots of a tree (e.g., a root system radius in conjunction with the tree location on the property), and also include a distance of the tree from a house or other structure, the predicted location and the distance may be analyzed to determine a risk of damage to the foundation of the structure.

The method 250 may also include receiving/determining other types of information pertaining to an area that includes the property. If weather forecast information is received, for example, that information may be analyzed along with the determined property feature(s) to determine the risk of damage at block 256. If it is known that high winds are expected over the coming days or weeks or months, for example, trees on the property (and particularly any trees of a species known to have shallow roots or to otherwise be susceptible to blowing over) may be viewed as being at an extra high risk of damaging the structure or object. Alternatively, if it is known that extended periods of rain are expected over the coming days or weeks or months, trees on the property (and particularly any trees of a species known to be susceptible to overturning due to wet soil) may be viewed as being at an extra high risk of damaging the structure or object.

As another example, if information about past or ongoing environmental stressors in the area is received (e.g., data provided by the United States Department of Agriculture), that information may be analyzed along with determined tree features such as tree species to determine the risk of damage at block 256. Environmental stressor information may include, for example, information indicating whether the area is or has been subject to prolonged drought, whether the area has water-logged soil (e.g., due to past or current flooding), whether the area is or has been subject to an ice storm, whether the area is or has been subject to a wildfire, whether the area is or has been subject to a tree disease (e.g., Dutch Elm disease) or an insect infestation, etc. With respect to insect infestations, for example, if a predicted spreading area of Emerald Ash Borers is known, and it was determined that one or more trees on the property are ash trees (e.g., by matching one or more known features of ash trees to features determined via image analysis techniques), it may be determined that those trees are at high risk of being unhealthy or dying. As another example, if it is known that pine bark beetles have been or are in the process of destroying trees in the area, trees on the property may be determined to be at higher risk of dying (e.g., being more vulnerable to wildfires, etc.).

The risk of damage determined at block 256 may include a risk of a particular type of damage occurring (e.g., a percent chance that a branch will fall on a house), and/or a predicted extent/amount of damage (e.g., an predicted dollar amount, a predicted area of roof that could be damaged, etc.), for example. These determinations may in part be made by using information stored in records associated with the policyholder, such as information about the construction type of the policyholder's house, for example.

Also in the method 250, a risk output may be generated based on the risk of damage to the structure or object (block 258). Block 258 may be performed by an action unit such as action unit 36 of FIG. 1, for example. The risk output may include an indication of whether action should be taken to mitigate the risk of damage as determined at block 256, an indication of whether insurance coverage associated with the structure or object should be offered (e.g., whether the structure or object is insurable based on insurance company policy/business rules), and/or a measure of the risk of damage to the structure or object. The risk output may be generated by determining whether the risk of damage determined at block 256 exceeds a threshold likelihood of damage and/or a threshold predicted amount of damage, or by determining whether a "risk score" calculated based on both damage likelihood and damage amount exceeds a threshold score, for example. In some embodiments, multiple thresholds may be used to delineate a plurality of risk ratings/ levels, and the risk output may be generated based on the risk rating/level. Information indicative of the generated risk output may be included in an automated electronic message (e.g., email, instant message or text message) that is caused to be sent to an employee (e.g., agent) of an insurance provider of which the policyholder is a customer, and/or to the policyholder. For example, an insurance agent may be sent an email advising risk mitigation for the policyholder Alternatively, or additionally, the risk output may be used to calculate an insurance premium for the policyholder. For example, another server or processing unit may use the risk output to automatically calculate the premium.

In an alternative embodiment, the property in the aerial image(s) may be the property of a neighbor of the policyholder. For example, a method similar to the method 250 may be used to determine the risk that a tree on the policyholder's property poses to a neighboring house (or other structure or object on a neighboring property). The policyholder may then be informed of the risk in order to prevent damage to the neighbor's house, for example.

VI. Exemplary Computer System for Using Aerial Images for Insurance Purposes

Figure 5:
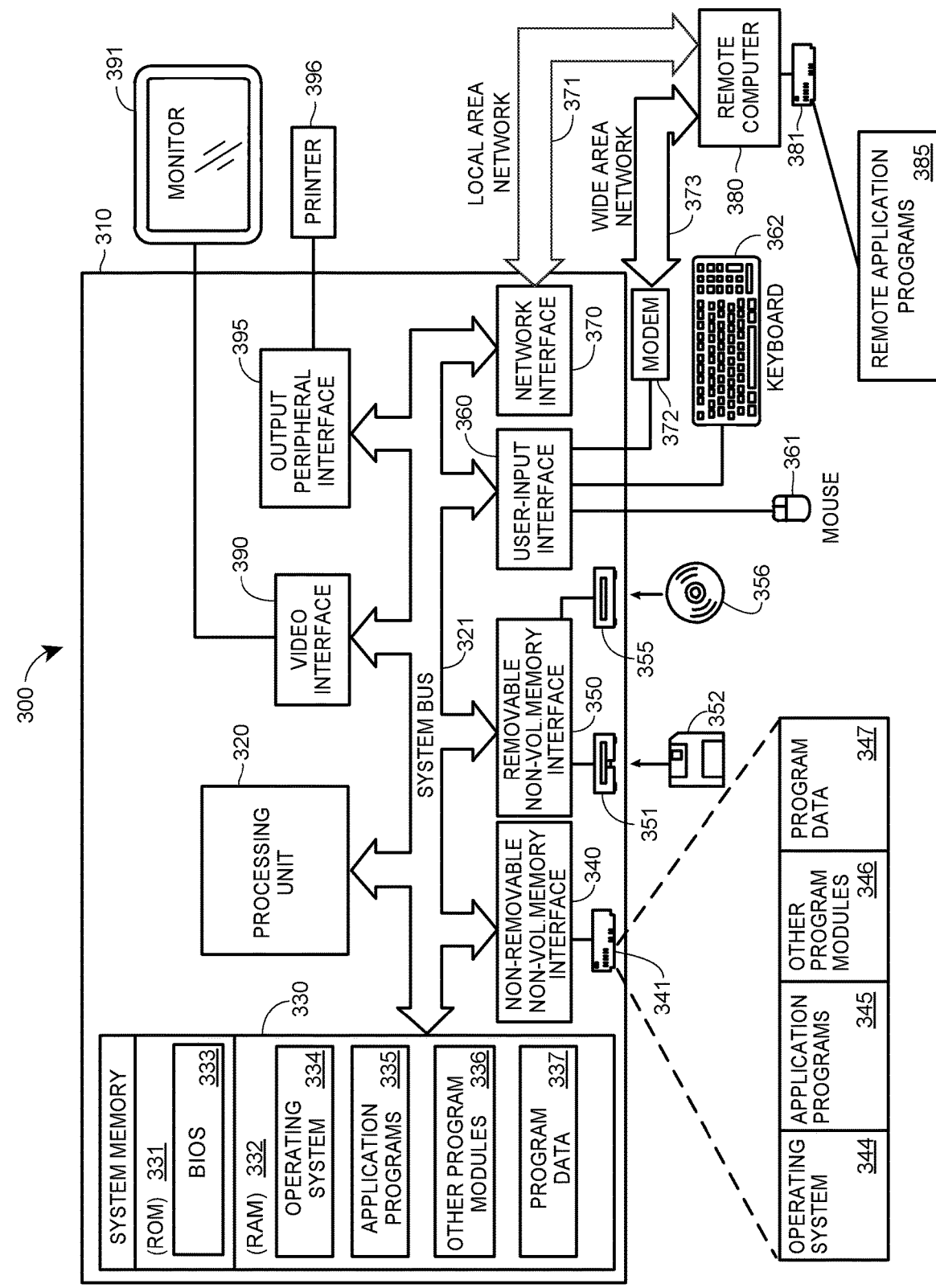
FIG. 5 depicts an exemplary computer system in which the techniques described herein may be implemented, according to an embodiment.

FIG. 5 depicts an exemplary computer system 300 in which the techniques described herein may be implemented, according to an embodiment. The computer system 300 of FIG. 5 may include a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 5 provide storage of computer-readable instructions, data structures, program modules and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 5 illustrates remote application programs 385 as residing on memory device 381.

The techniques for using aerial imagery for insurance purposes that are described above may be implemented in part or in their entirety within a computer system such as the computer system 300 illustrated in FIG. 5. The computer 310 may be an insurance provider's server or other computing device (e.g., within computing system 16 of FIG. 1) that receives and processes aerial images, for example. Application programs 335 and 345 may include programs implementing the functionality of image processing unit 32, risk analysis unit 34, and/or action unit 36, for example. Alternatively, the computer may be a third party server or other computing device (e.g., within computing system 16 of FIG. 1) that receives and processes aerial images before sending results to the insurance provider. For example, application programs 335 and 345 may include programs implementing the functionality of image processing unit 32 and risk analysis unit 34, with the outputs of risk analysis unit 34 being sent to a computing device of the insurance provider (e.g., remote computer 380) via a network such as WAN 373. Remote computer 380 may store and execute application programs implementing the functionality of action unit 36, for example.

As another example, in an embodiment where the computer 310 implements the functionality of action unit 36, the computer 310 may cause monitor 391 to display various messages generated by action unit 36, such as indications of risk levels, insurability of a property, and/or suggested risk-mitigating actions. Alternatively, the computer 310 may send the messages to remote computer 380, and/or to a different computing device.

VII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of using aerial images for insurance purposes through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   receiving, by one or more processors, one or more digital aerial images of a property of a current or potential policyholder;

processing, by one or more processors, the one or more digital aerial images according to one or more image analysis techniques to determine one or more features of the property, wherein processing the one or more digital aerial images includes determining one or more features of a tree located on or near the property;

determining a predicted location of roots of the tree based upon the one or more features of the tree;

analyzing, by one or more processors, the one or more features of the property to determine a risk of damage to a structure located on the property, wherein analyzing the one or more features of the property includes analyzing at least the predicted location of roots of the tree to determine a risk of damage to a foundation of the structure; and generating, by one or more processors and based at least in part on the risk of damage to the structure, a risk output that includes one or more of (i) an indication of whether action should be taken to mitigate the risk of damage to the structure, (ii) an indication of whether insurance coverage associated with the structure should be offered, or (iii) a measure of the risk of damage to the structure.

2. The computer-implemented method of claim 1, wherein receiving the one or more digital aerial images includes receiving one or more digital aerial images obtained using at least one of (i) a sensor mounted on a satellite, (ii) a sensor mounted on an airplane, or (iii) a sensor mounted on a drone.

3. The computer-implemented method of claim 2, wherein receiving the one or more digital aerial images includes receiving one or more digital aerial images obtained using at least one of (i) a camera, (ii) a spectrometer, (iii) a light detection and ranging (LiDAR) device, (iv) a semi-global matching (SGM) device, or (v) a Synthetic Aperture Radar Interferometry (IFSAR) device.

4. The computer-implemented method of claim 1, wherein:
receiving the one or more digital aerial images includes receiving a plurality of digital aerial images (i) obtained using a camera and (ii) including at least two digital aerial images having different angles of incidence with respect to the property;
determining the one or more features of the tree includes (i) processing the at least two digital aerial images having the different angles of incidence to determine a height of the tree, and (ii) processing at least one of the plurality of digital aerial images to determine a distance between the tree and the structure; and
analyzing the one or more features of the property to determine the risk of damage to the structure includes analyzing the height of the tree and the distance between the tree and the structure to determine a risk of the tree falling on the structure.

5. The computer-implemented method of claim 1, wherein:
receiving the one or more digital aerial images includes receiving a plurality of digital aerial images that includes a LiDAR, IFSAR or SGM image of the property;
determining the one or more features of the tree includes (i) processing the LiDAR, IFSAR or SGM image to determine a height of the tree, and (ii) processing at least one of the plurality of digital aerial images to determine a distance between the tree and the structure; and analyzing the one or more features of the property to determine a risk of damage to the structure includes analyzing the height of the tree and the distance between the tree and the structure to determine a risk of the tree falling on the structure.

6. The computer-implemented method of claim 1, wherein determining the one or more features of the tree includes determining an orientation of a branch of the tree with respect to the structure.

7. The computer-implemented method of claim 1, wherein determining the one or more features of the tree includes determining a species of the tree.

8. The computer-implemented method of claim 7, wherein:
determining the one or more features of the tree includes determining one or both of a height of the tree and a crown width of the tree, and
using (i) the species of the tree, and (ii) one or both of the height of the tree and the crown width of the tree, to determine a stage of a life cycle of the tree; and
analyzing the one or more features of the property to determine a risk of damage to the structure includes analyzing at least the stage of the life cycle of the tree to determine the risk of at least a portion of the tree falling on the structure.

9. The computer-implemented method of claim 7, wherein:
receiving the one or more digital aerial images includes receiving a spectrometer image obtained using a spectrometer; and
determining a species of the tree includes analyzing the spectrometer image to determine the species of the tree.

10. The computer-implemented method of claim 1, wherein:
determining the one or more features of the tree includes determining one or more features of leaves on the tree;
the method further comprises determining a time of year corresponding to at least one of the one or more digital aerial images; and
analyzing the one or more features of the property to determine a risk of damage to the structure includes using (i) the one or more features of leaves on the tree, and (ii) the time of year, to determine the risk of damage to the structure.

11. The computer-implemented method of claim 1, further comprising:
determining a type of a roof of the structure,
wherein analyzing the one or more features of the property to determine a risk of damage to the structure includes using (i) the one or more features of the tree, and (ii) the type of the roof, to determine the risk of damage to the roof.

12. The computer-implemented method of claim 1, further comprising:
determining environmental stressor information with respect to an area that includes the property, the environmental stressor information including one or more of (i) whether the area is or has been subject to prolonged drought, (ii) whether the area has waterlogged soil, (iii) whether the area is or has been subject to an ice storm, (iv) whether the area is or has been subject to a wildfire, or (v) whether the area is or has been subject to a tree disease or insect infestation,
wherein analyzing the one or more features of the property to determine a risk of damage to the structure includes using (i) the one or more features of the tree, and (ii) the environmental stressor information, to determine the risk of damage to the structure.

13. The computer-implemented method of claim 1, further comprising:
determining weather forecast information with respect to an area that includes the property,
wherein analyzing the one or more features of the property to determine a risk of damage to the structure includes using (i) the one or more features of the property, and (ii) the weather forecast information, to determine the risk of damage to the structure.

14. The computer-implemented method of claim 1, wherein processing the one or more digital aerial images to determine the one or more features of the property includes determining one or more features of a snow or ice formation located on a roof of a structure located on the property.

15. The computer-implemented method of claim 1, further comprising:
determining whether the risk of damage to the structure exceeds one or both of (i) a threshold likelihood of damage, and (ii) a threshold predicted amount of damage,
wherein generating the risk output includes generating the indication that action should be taken to mitigate the risk of damage to the structure in response to determining that the risk of damage exceeds one or both of (i) the threshold likelihood of damage, and (ii) the threshold predicted amount of damage.

16. The computer-implemented method of claim 1, wherein generating the risk output includes causing an automated electronic message indicative of the risk output to be sent to one or both of (i) an employee of an insurance provider of which the policyholder is a customer, and (ii) the policyholder.

17. A tangible, non-transitory computer-readable medium storing instructions that, when executed by one or more processors, cause the one or more processors to:
receive one or more digital aerial images of a property of a current or potential policyholder;
process the one or more digital aerial images according to one or more image analysis techniques to determine one or more features of the property, wherein processing the one or more digital aerial images includes determining one or more features of a tree located on or near the property;
determine a predicted location of roots of the tree based upon the one or more features of the tree;
analyze the one or more features of the property to determine a risk of damage to a structure located on the property, wherein analyzing the one or more features of the property includes analyzing at least the predicted location of roots of the tree to determine a risk of damage to a foundation of the structure; and
generate, based at least in part on the risk of damage to the structure, a risk output that includes one or more of (i) an indication of whether action should be taken to mitigate the risk of damage to the structure, (ii) an indication of whether insurance coverage associated with the structure should be offered, or (iii) a measure of the risk of damage to the structure.

18. The tangible, non-transitory computer-readable medium of claim 17, wherein:
receiving the one or more digital aerial images includes receiving a plurality of digital aerial images (i) obtained using a camera and (ii) including at least two digital aerial images having different angles of incidence with respect to the property;
determining the one or more features of the tree includes (i) processing the at least two digital aerial images having the different angles of incidence to determine a height of the tree, and (ii) processing at least one of the plurality of digital aerial images to determine a distance between the tree and the structure; and
analyzing the one or more features of the property to determine the risk of damage to the structure includes analyzing the height of the tree and the distance between the tree and the structure to determine a risk of the tree falling on the structure.

19. The tangible, non-transitory computer-readable medium of claim 17, wherein determining the one or more features of the tree includes determining a species of the tree.

20. The tangible, non-transitory computer-readable medium of claim 19, wherein:
determining the one or more features of the tree includes determining one or both of a height of the tree and a crown width of the tree, and
using (i) the species of the tree, and (ii) one or both of the height of the tree and the crown width of the tree, to determine a stage of a life cycle of the tree; and
analyzing the one or more features of the property to determine a risk of damage to the structure includes analyzing at least the stage of the life cycle of the tree to determine the risk of at least a portion of the tree falling on the structure.

* * * * *